United States Patent
Rampson et al.

(10) Patent No.: US 9,934,331 B2
(45) Date of Patent: Apr. 3, 2018

(54) QUERY SUGGESTIONS

(71) Applicant: Microsoft Technology Licensing, LLC, Redmond, WA (US)

(72) Inventors: Benjamin Edward Rampson, Woodinville, WA (US); Nickolas Dwayne Welton, Seattle, WA (US); Venkata Srinivas Irava, Bothell, WA (US); Mark Alan Mullins, Sammamish, WA (US); Andrew Grey Carlson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 287 days.

(21) Appl. No.: 14/323,365

(22) Filed: Jul. 3, 2014

(65) Prior Publication Data
US 2016/0004712 A1    Jan. 7, 2016

(51) Int. Cl.
*G06F 7/00* (2006.01)
*G06F 17/30* (2006.01)

(52) U.S. Cl.
CPC ...... *G06F 17/3097* (2013.01); *G06F 17/3064* (2013.01)

(58) Field of Classification Search
CPC .............. G06F 17/30867; G06F 17/30; G06F 17/3097; G06F 17/3064; G06F 17/30646; G06F 17/30029; G06F 17/30277; G06C 30/0631; G06C 50/01
See application file for complete search history.

(56) References Cited

U.S. PATENT DOCUMENTS

| | | | |
|---|---|---|---|
| RE39,326 E | 10/2006 | Comer | |
| 8,078,643 B2 | 12/2011 | Mush et al. | |
| 8,392,435 B1* | 3/2013 | Yamauchi | G06F 17/3064 707/749 |
| 8,615,707 B2 | 12/2013 | Fortuna et al. | |
| 8,676,828 B1 | 3/2014 | Agarwal et al. | |
| 2009/0112848 A1 | 4/2009 | Kunjithapatham et al. | |
| 2010/0228710 A1 | 9/2010 | Imig | |
| 2011/0202517 A1 | 8/2011 | Reddy et al. | |
| 2012/0246260 A1 | 9/2012 | Alon | |
| 2012/0265779 A1 | 10/2012 | Hsu et al. | |
| 2013/0086067 A1 | 4/2013 | Khoussainova et al. | |
| 2013/0086460 A1 | 4/2013 | Folting et al. | |
| 2013/0124960 A1 | 5/2013 | Velingkar et al. | |

(Continued)

OTHER PUBLICATIONS

"International Search Report & Written Opinion Received for PCT Application No. PCT/US2015/038921", dated Nov. 13, 2015, 11 Pages.

(Continued)

*Primary Examiner* — Azam Cheema
(74) *Attorney, Agent, or Firm* — Schwegman Lundberg & Woessner, P.A.

(57) ABSTRACT

Technologies are described herein for providing query suggestions. In order to provide a query suggestion, access may be detected at a data source. An initial query suggestion for a query of the data source may then be identified based, at least in part, on non-query data. The initial query suggestion may then be returned for display in a user-interface (UI) element. Additional query suggestions might also be provided based upon non-query data in response to a modification of the query.

14 Claims, 10 Drawing Sheets

(56) References Cited

U.S. PATENT DOCUMENTS

2015/0178302 A1* 6/2015 Plakhov ............ G06F 17/30864
707/706
2015/0310487 A1* 10/2015 Xu ...................... G06F 17/3053
705/14.46

OTHER PUBLICATIONS

"International Preliminary Report on Patentability Issued in PCT Application No. PCT/US2015/038921", dated Sep. 16, 2016, 8 Pages.
The PCT Written Opinion of the International Preliminary ExaminingA Authority dated May 27, 2016 for PCT application No. PCT/US2015/038921, 7 pages.

* cited by examiner

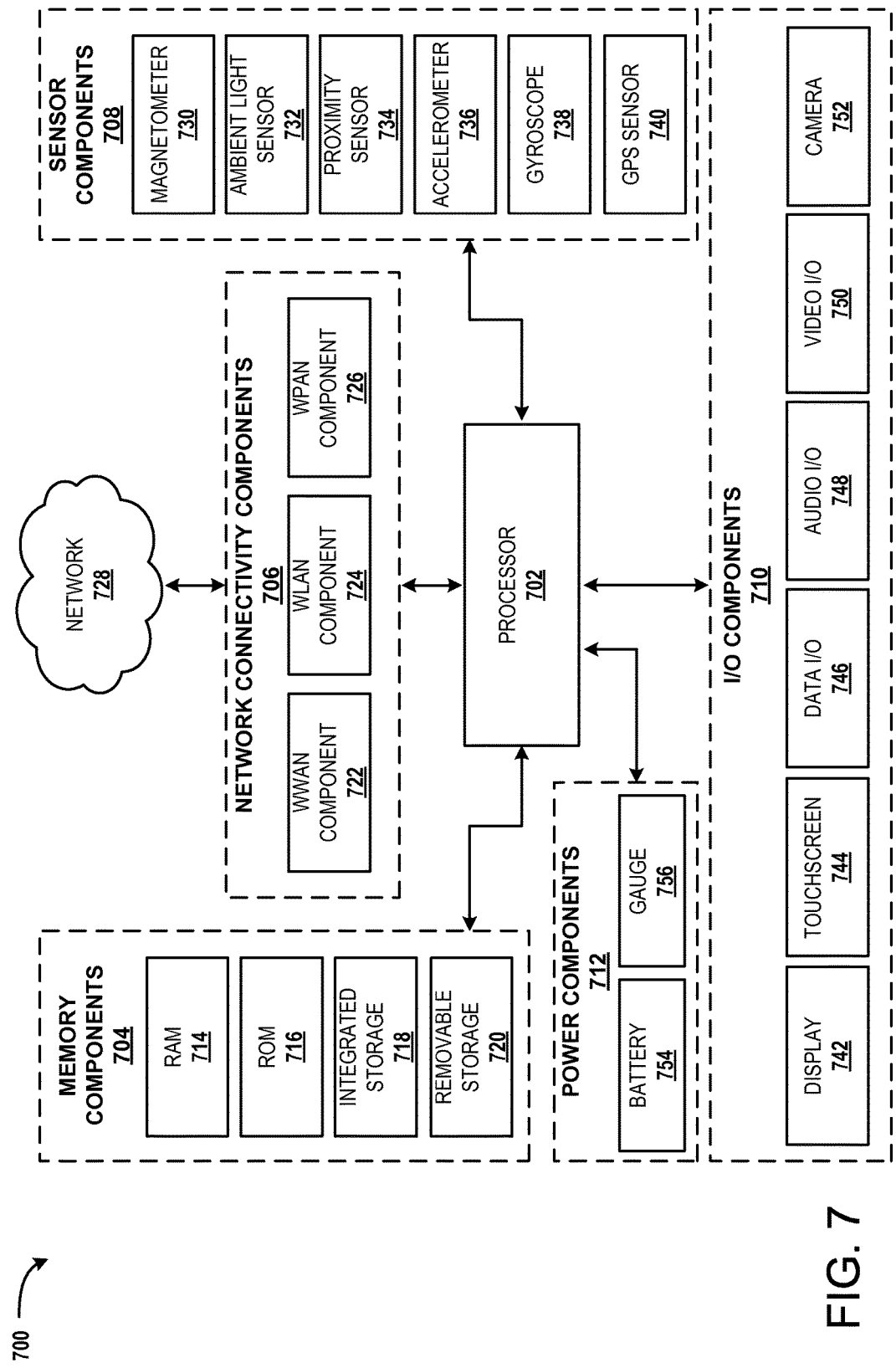

QUERY SUGGESTIONS

BACKGROUND

When creating a connection to an external data source (e.g. configuring a spreadsheet to make a connecting to a database), it may be very difficult for a user to build queries that pull in information that the user wants to retrieve. In order to obtain the information that the user wants to retrieve, a user building a connection may need to understand the data that is available in the data source. For example, a user might need to understand field names, table organization, and/or the relationships between tables in order to effectively construct a query. Without understanding the organization of the data source, users are often forced to hunt through very large data sources to locate fields of interest. Given the complexity of this task and the detailed knowledge of the data source required, many users give up on building their own queries.

It is with respect to these and other considerations that the disclosure made herein is presented.

SUMMARY

Technologies are described herein for providing query suggestions. In order to provide a query suggestion, access may be detected at a data source. A suggestion for a search query for the data source may then be determined based, at least in part, on non-query data (i.e. data not contained in the query). The suggestion may then be returned to a client for display in a suitable a user-interface ("UI") element.

It should be appreciated that the above-described subject matter may also be implemented as a computer-controlled apparatus, a computer-implemented process, a computing system, or as an article of manufacture such as a computer-readable medium. Although the technologies presented herein are primarily disclosed in the context of providing query suggestions at least initially based upon non-query data, the concepts and technologies disclosed herein might also be utilized to provide additional suggestions based on query data as well. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 7 is a computer architecture diagram illustrating a computing device architecture capable of implementing aspects of the technologies presented herein.

DETAILED DESCRIPTION

Figure 1:
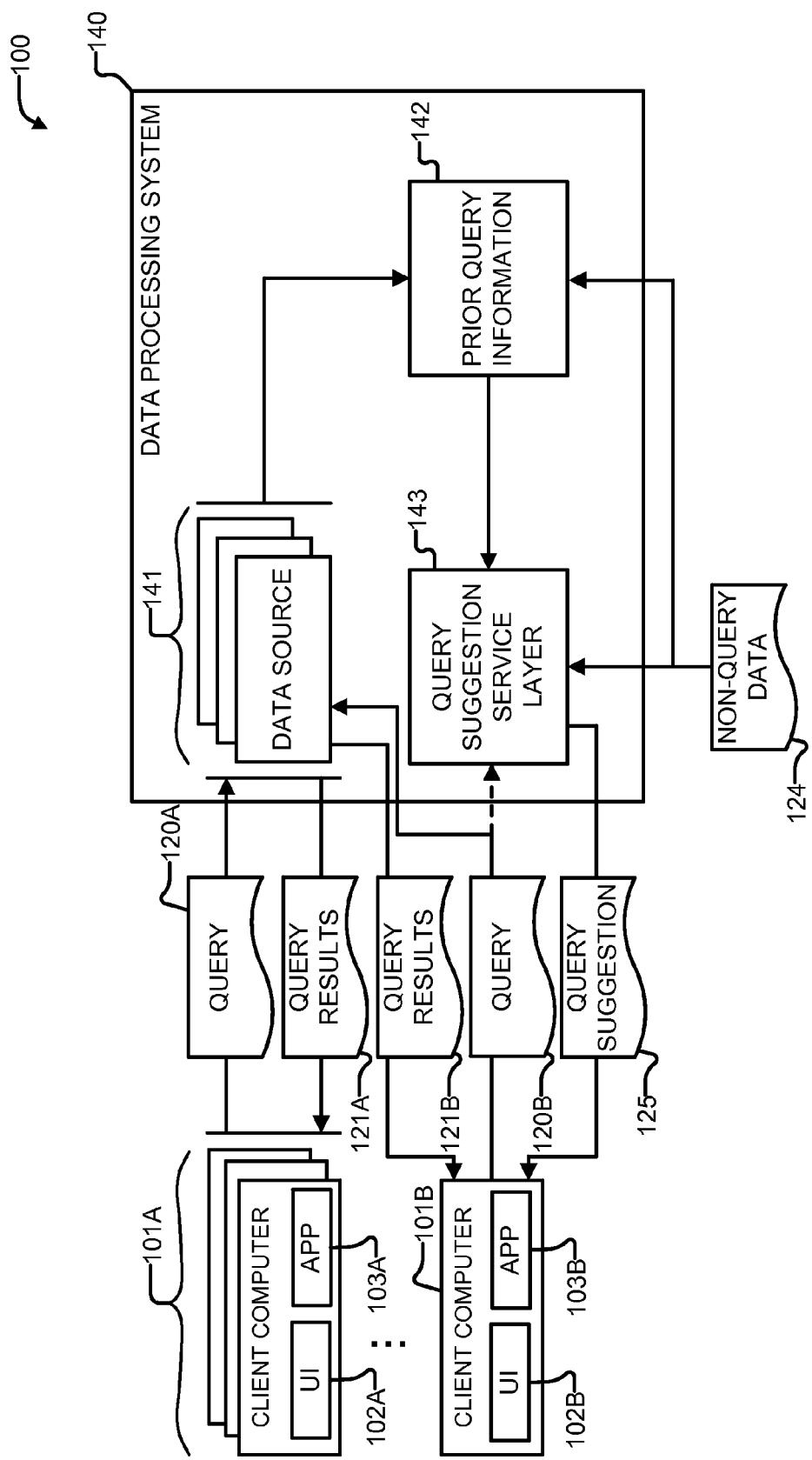
FIG. 1 is a network diagram showing aspects of an illustrative operating environment and several software components disclosed herein.

The following detailed description is directed to technologies for providing query suggestions. The query suggestions may be provided through a graphical UI or an element thereof. The query suggestions may at least initially be based upon non-query data, such as, for example, identity data, profile data, contextual information, or other non-query data. Additional query suggestions may also be based on query data, such as, for example, partial query statements, full query statements, or any combination thereof, which are related to a query being created and/or manipulated.

As discussed briefly above, novice users of database and data processing systems may have difficulty assembling database queries. Utilizing an implementation of the technologies disclosed herein, however, query suggestions can be provided to novice users (and more advanced users) such that complete and appropriate data queries are created based at least initially upon non-query data. Through use of non-query data, an initial query suggestion may be generated and provided to a user for display of a partial set of query results. Subsequently, additional query suggestions may also be provided based on the partial set of query results and non-query data, with additional partial results being displayed based upon selected suggestions. Thus, novice users can view the progress of results by selective creation/building of a query through the suggestions, and further, can more easily determine how to structure future queries.

Accordingly, an implementation of the technologies disclosed herein may require in reduced effort from novice users wishing to create a database query. Additionally, utilizing the technologies disclosed herein, users may be able to create a more complete initial database query. Reduced effort might also be required from users when creating future queries. Increasingly accurate query suggestions might also be provided that are based on stored or previous query usage. Although listed separately, it should be appreciated that the benefits described above may be achieved individually, independently, or in partial/full combination according to any desired implementation of the technologies disclosed herein. Moreover, additional benefits may become apparent through an implementation of the technologies described herein.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., aspects of a computing system and methodology for providing query suggestions will be described.

Turning now to FIG. 1, details will be provided regarding an illustrative operating environment and several software components disclosed herein. In particular, FIG. 1 shows aspects of a system 100 for providing query suggestions. The system 100 includes one or more client computers 101A and 101B (which may be referred to herein in the singular as a "client 101" and/or in the plural as the "clients 101") in operative communication with a data processing system 140. The clients 101 may be any suitable computer systems including, but not limited to, desktop or laptop personal computers, tablet computing devices, smartphones, other types of mobile devices, or the like.

The clients 101 may be configured to execute software products, such as applications 103 that provide user interfaces 102 for the creation, editing, and submitting of queries for accessing information stored at the data processing system 140. In this regard, the clients 101 may provide one or more queries 120A and receive query results 121A in response thereto. The queries 120A may be submitted for transmission over a network (not shown in FIG. 1), in some configurations. The network may include a computer communications network such as the Internet, a local area network ("LAN"), wide area network ("WAN"), or any other type of network, and may be utilized to submit the queries 120A to the data processing system 140 for query processing, and subsequently, for returning query results 121A. Submission of queries 120A and the returning of query results 121A are described more fully below with reference to FIG. 2.

As shown in FIG. 1, a query 120B and non-query data 124 may be submitted by one or more clients 101 for transmission to the data processing system 140. The query 120B may include partial query statements, complete query statements, or any combination thereof. The query 120B may also include information related to a partial or a new query currently being processed or built through the suggestions provided by the mechanism disclosed herein.

The non-query data 124 may include contextual information, identification information, user profile data, or any other suitable information not contained in the query 120B. The non-query data 124 may also include metadata related to activities at a client 101 in some implementations. For example, the non-query data 124 may describe activities related to access at the data processing system 140 or a data source 141, activities related to contact or communications with other users or clients, or other similar activities that can in turn be used to more accurately determine query suggestions 125.

According to at least one configuration, the non-query data 124 includes data describing a user of a client 101, such as, employment data, employee identification data, employee group/committee data, and other similar data. In another configuration, the non-query data 124 includes data describing current or predicted activities for a user of a client 101, such as, for example, data describing typical data source utilization for the user or for similar users, data describing typical query structure for the user or for similar users, and other similar data. Additionally, the non-query data 124 may include enterprise or corporate information in some implementations. The non-query data 124 may also include other forms of data that is not included in a query 120B without departing from the scope of this disclosure.

As described in detail below, the non-query data 124 may be used to identify queries created by users or clients 101 related to a user or client 101 wishing to create a new query. Responsive to transmission of non-query data 124, one or more query suggestions 125 may be returned to the client 101. Additionally, upon selection of any query suggestion 125, a query 120B may be updated to reflect the selection and/or changes, and transmitted to the data processing system 140. Thereafter, additional query suggestions 125 may be provided to the client 101, along with query results 121B. Submission of non-query data 124, a query 120B, and the return of query suggestion 125 are described more fully below with reference to FIGS. 3-4.

As illustrated in FIG. 1, the data processing system 140 includes several components configured to perform processing functions as described herein related to processing and storing queries 120, processing of non-query data 124, returning query results 121, and query suggestions 125, and other functionality. For example, the data processing system 140 may be configured to receive and process the queries 120 at one or more of a plurality of data sources 141 (which may be referred to herein in the singular as a "data source 141" and/or in the plural as the "data sources 141").

Generally, a data source 141 receives a query 120A, performs the query based on query statements contained therein, and returns the query results 121A. Furthermore, according to aspects of the technologies presented herein, prior query information 142 may be populated with previous queries and/or metadata describing non-query data 124 associated with the previous queries. Accordingly, at least a portion of the query 120A may be stored as prior query information 142 alongside non-query data 124 associated with the clients 101 and users thereof. Although described as "prior" query information, it should be understood that prior query information 142 can also include a set of basic query statements, a set of pre-populated query statements reflective of some non-query data 124, a set of default query statements, and/or any other query information not directly based on previously submitted or completed queries 120A.

It is noted that the acts described above as related to the data sources 141 and prior query information 142 can be continually performed according to some configurations. Thus, as new queries 120 are received, one or more portions of submitted queries may be stored as prior query information 142, in addition to the basic information described above, for use in providing query suggestions 125 as described below.

As shown in FIG. 1, the data processing system 140 includes a query suggestion service layer 143 executing therein in one configuration. The query suggestion service layer 143 is a software service or application, and may be separately integrated within each data source 141 (not illustrated) in some implementations. However, the query suggestion service layer 143 can also execute as a stand-alone query suggestion service layer (as illustrated) in some implementations.

The query suggestion service layer 143 is configured to process a received non-query data 124, and to generate a query suggestion 125 based upon the query 120B, non-query data 124, and stored prior query information 142. The query suggestion service layer 143 compares information in the non-query data 124 to return an initial query suggestion 125. The initial query suggestion 125 can be a partial or complete query statement, sorting statement, filtering statement, or other portion of a query. The initial query suggestion 125 can be provided as a user interface (UI) element in some implementations.

The query suggestion service layer 143 may continually process non-query data 124, queries 120, and stored prior query information 142 to actively score or rank potential query suggestions. The ranking may be based upon a confidence measure that a particular query suggestion is relevant to a user based on the non-query data 124, query 120, and prior query information 142. Accordingly, one or more query suggestions 125 may be generated, ranked, and a portion thereof (or at least one thereof) may be presented as the initial query suggestion 125. Alternatively, several ranked query suggestions may be provided as a set of initial query suggestions 125.

Upon acceptance, selection, or other action taken on the initial suggestion, the query suggestion service layer 143 can provide additional query suggestions 125 such that a query is built from the individual suggestions, new query statement portions 120B provided by a user, or any combination thereof. Generally, the initial query suggestion 125 and additional query suggestions 125 can be determined through comparison and/or matching of metadata or query 120 to prior query information 142 and/or prior metadata information. Thus, as new suggestions 125 are selected and query 120B is manipulated, additional suggestions are generated based on the applied suggestions. Building a query 120B through the suggestions 125 described above is described more fully with reference to FIGS. 4A-4D.

Figure 2:
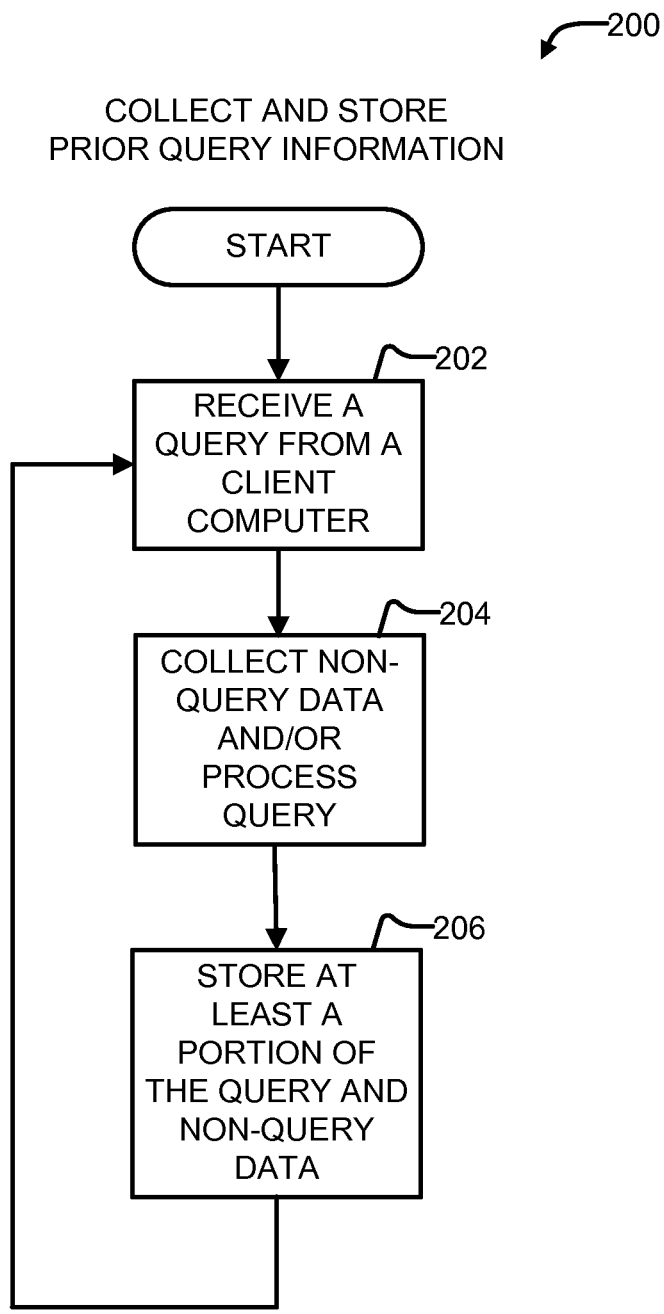
FIG. 2 is a flow diagram showing aspects of one illustrative routine for processing user queries.

Referring now to FIG. 2, additional details will be provided regarding the processing of queries by the data processing system 140, and collecting and storing prior query information 142. In particular, FIG. 2 is a flow diagram showing aspects of one illustrative method 200 for processing of data queries 120, in one configuration presented herein.

As illustrated, the method 200 includes receiving a query 120A from client computer 101, at block 202. For example, in the example shown in FIG. 1, the received query 120A is directed to at least one data source 141. Accordingly, the data source 141 receives and processes the query 120A to produce query results 121A in this example.

Additionally, in response to receipt of the query 120A, the method 200 further includes collecting non-query data 124 related to the client computer 101, at block 204. The non-query data 124 may take any of the forms described above, and may be collected by the target data source 141 for storage as prior query information 142. Upon collection of the non-query data 124, at least a portion of the received and/or processed query 120A and the collected non-query data 124 may be stored as prior query information 142, at block 206. Additional queries 120 may be received and processed as described above with relation to blocks 202-206. As described above, at least a portion of non-query data 124 related to the client 101 and the query 120A is stored as prior query information 142. The stored data can be used as described below to generate query suggestions 125 based on newly collected non-query data 124 and/or a query 120B.

Figure 3:
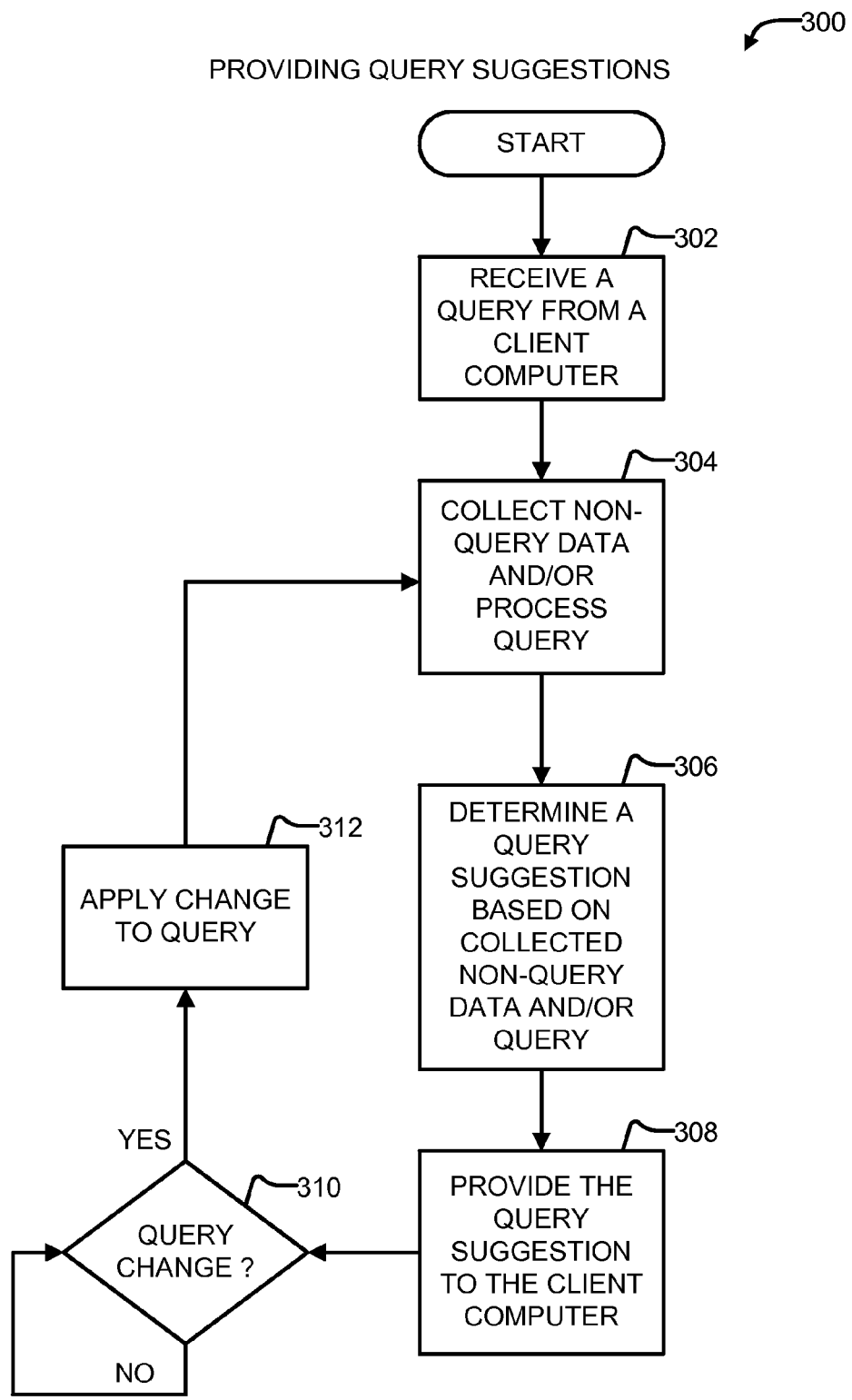
FIG. 3 is a flow diagram showing aspects of one illustrative routine for providing query suggestions.

Turning now to FIG. 3, additional details will be provided regarding the technologies presented herein for providing one or more query suggestions 125. In particular, FIG. 3 is a flow diagram showing aspects of one illustrative method 300 for processing of non-query data 124 by the query suggestion service layer 143.

The method 300 includes receiving a query 120B from a client 101 at block 302. Although described as receiving an actual query 120B, it should be understood that the method 300, and block 302, may be adaptable to begin execution through opening of a file, opening of a previous query, action upon a default query, action upon a data file, or any other suitable act through a client 101, application 103, and/or user interface 102. Accordingly, block 302 can also include detecting access at a data source 141, initialization of a client 101, initialization of an application 103, or another type of action through the user interface 102. The access at the data source 141 can encompass a request for access to data stored at the data source 141, through, for example, user interfaces 102, input arguments in a portion of a query statement, or other suitable manners of data access.

The method 300 further includes collecting non-query data 124 and/or processing a query 120B at block 304. For example, non-query data 124 related to a client 101 and/or a user thereof may be received at query suggestion service layer 143. Thereafter, the query suggestion service layer 143 can analyze the non-query data 124, a query 120B, and/or prior query information 142 to determine an initial query suggestion 125 at block 306. The initial query suggestion 125 is provided to the client 101 at block 308.

Upon action by the client 101 on the initial query suggestion 125, the query suggestion service layer 143 may provide additional query suggestions 125 based upon the non-query data 124, the query 120B, and/or the prior query information 142. For example, the query suggestion service layer 143 or data source 141 may determine that a query change is apparent after providing the query suggestion 125 at block 310. When a query change has been detected, the change is applied to the query 120B at block 312, and the query 120B is processed at block 304. Alternatively, no query change may be detected at block 310 and the method may resume receiving information for determining new query suggestions 125. The information from the processed query 120B and non-query data 124 may then be used to determine new query suggestions 125 through iteration of blocks 306-312.

It is noted that according to some implementations, only the initial query suggestion 125 based upon the non-query data 124 may be provided. According to other implementations, additional iterations of query suggestions 125 may also be provided. Additionally, the query suggestions 125 acted upon at the client 101 may be manipulated by a user thereby creating a new query 120B to be used for new query suggestions 125. In this manner, many different query suggestions 125 related to actions at the client 101, a query 120B, and/or non-query data 124 may be provided by the query suggestion service layer 143, and many different queries may be built.

The query suggestions 125 may take a variety of forms. For example, the query suggestions 125 may include a textual hint such as an automatic textual fill suggestion for a portion of a textual query statement being created through user interface 102. The query suggestions 125 might include a UI element rendered through the user interface 102. The UI element may include any desired graphical element, and may fully or partially describe a query suggestion 125.

Upon action by the client 101 on the query suggestion 125, the user interface 102 may at least partially render results of the query suggestion 125 based on the action. For example, if a particular query suggestion 125 is selected, the results of the selection may be at least partially rendered through the user interface 102. Furthermore, manipulation of the full or partial results may also be possible, for example, through manipulation of the user interface 102 or individual elements rendered therein. Illustrative user Interfaces and individual UI elements are described below with reference to FIGS. 4A-4D.

FIGS. 4A-4D are user interface diagrams showings aspects of an illustrative user interface provided by an illustrative application 103, according to several configurations presented herein. The user interface described with relation to FIGS. 4A-4D may be arranged similar to a spreadsheet interface for a spreadsheet application having access to one or more data sources and/or data processing systems. Other user interfaces are also applicable, and therefore, the present disclosure is not limited to the particular forms of interfaces illustrated, but to any available user interface.

Figure 4A:
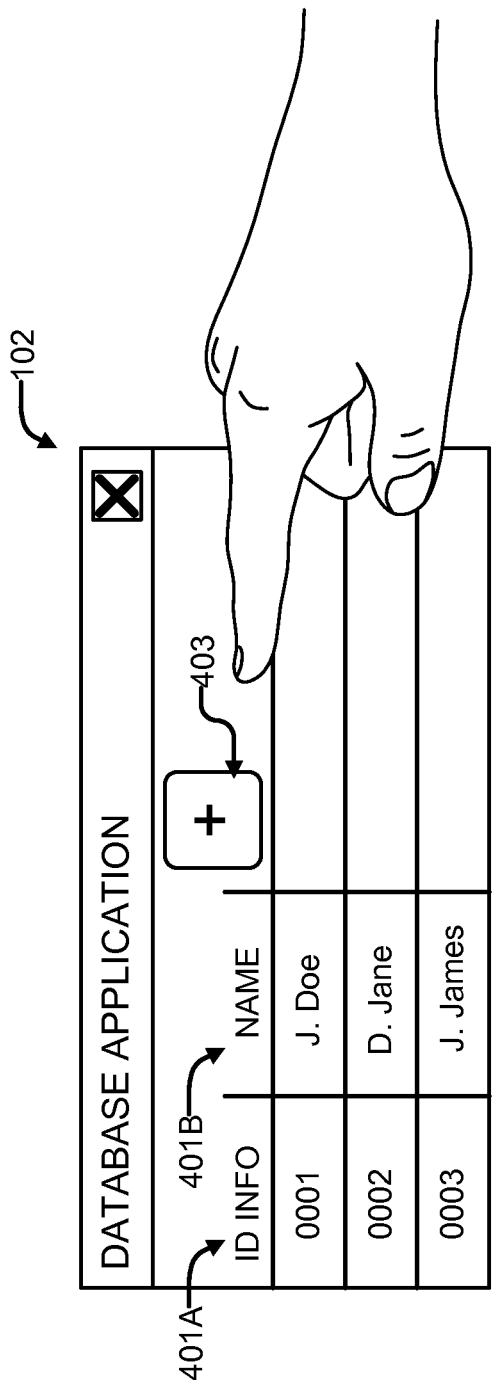
FIGS. 4A-4D are UI diagrams showings aspects of several illustrative UIs for providing query suggestions, according to several configurations presented herein.

Turning to FIG. 4A, an illustrative user interface 102 will be described for presenting query suggestions. As shown, the user interface 102 includes a plurality of columns 401 representing data fields accessed through a query 120 at data target 141. The query 120, in this example, includes "ID Info+Name". The queried data is displayed in rows in FIG. 4A. However, it should be understood that any desired form of data display may be implemented without departing from the scope of this disclosure. For example, pivot tables, charts, plots, or any other suitable query structure or element displayable through the interface 102 is applicable. Accordingly, some implementations of the technologies presented herein may deviate from those particular forms illustrated without departing from the scope of this disclosure. Furthermore, although illustrated as including data fields accessed through at least partial processing of a query, the same may be varied such that no data fields are initially present, for example, if opening a new document or blank document.

The user interface 102 also includes a query suggestion UI element 403 rendered therein. The query suggestion UI element 403 may signal access or a request to access a data source 141 as described above. Additionally, or in the alternative, the query suggestion UI element 403 may signal a request for a query suggestion 125. Furthermore, the query suggestion UI element 403 may indicate that a new query suggestion 125 is available to a user through selection of the element 403. For example, the query suggestions service layer 143 may have continually calculated, ranked, and determined one or more query suggestions 125 for consumption by a user. Upon selection by a user of the query suggestion UI element 403, the query suggestion service layer 143 may provide one or more query suggestions 125, as illustrated in FIG. 4B.

Figure 4B:
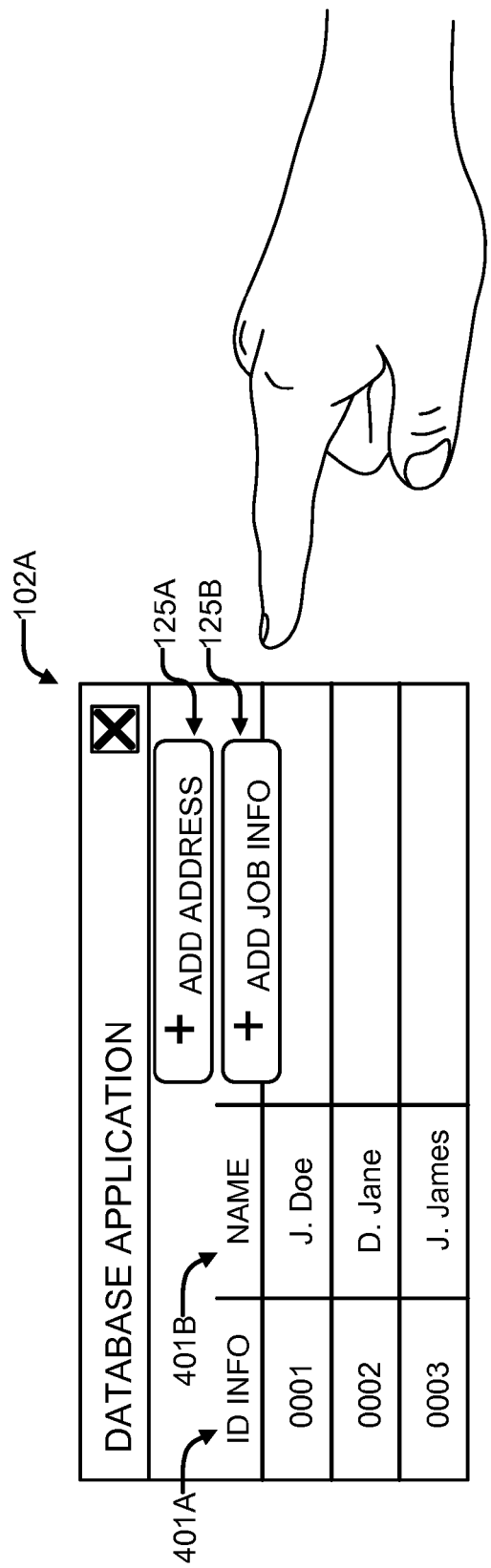

The user interface 102A of FIG. 4B includes two query suggestions 125A and 125B rendered therein. It should be understood that alternative labeling of the query suggestions 125 such as, for example, labeling comprising indicia representative of the actual content of the query suggestion 125 can also be implemented. For example, the query suggestion 125A may comprise accessing a data field labeled "Job Info." Additionally, query suggestion 125B may comprise accessing a data field labeled "Address."

Generally, the query suggestions 125A and 125B, and other query suggestions 125 described herein, may be based at least partially on non-query data 124. As described above, non-query data may take a variety of forms, including employment data. In this particular example, non-query data 124 may indicate a user of the interface 102A as belonging to a particular group of employees. Furthermore, the particular group of employees may regularly generate queries including both "Address" and "Job Info." Accordingly, as illustrated in this example, query suggestions 125A and 125B are based at least in part upon the likelihood that a member of the particular group of employees would typically include "Address" and/or "Job Info" in a query. It should be readily understood that other forms and manners of taking into consideration non-query data 124 are also applicable. Thereafter, if the query suggestion 125A is selected, the data field named "Job Info" may be appended to the query and presented in the user interface 102B, as illustrated in FIG. 4C.

Figure 4C:
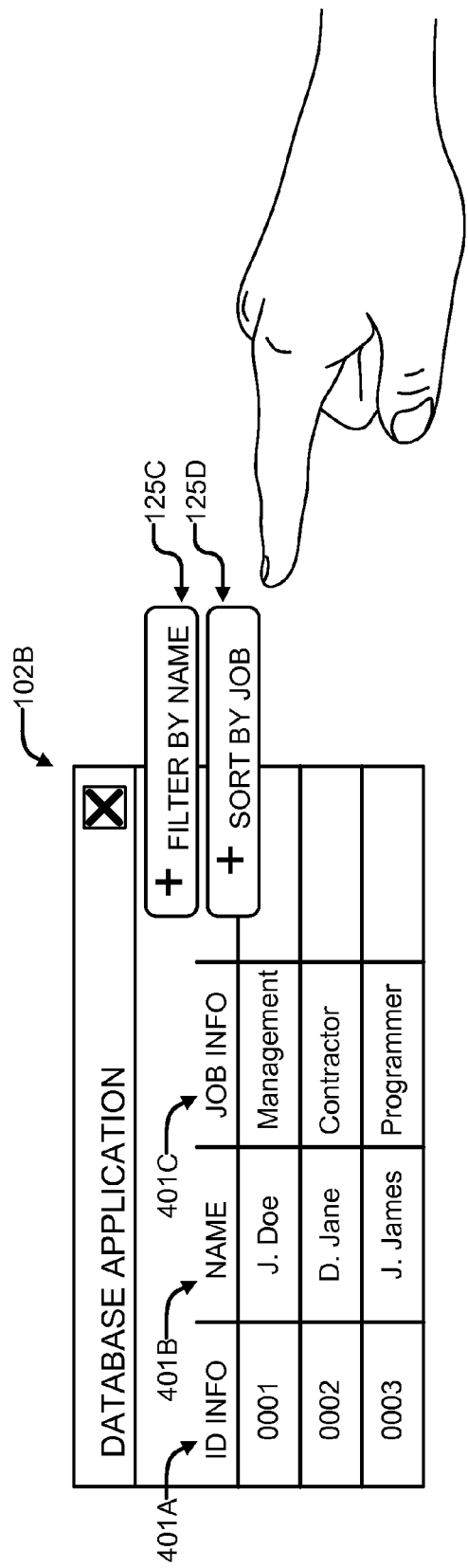

As shown in FIG. 4C, the user interface 102B includes the query suggestion 125A rendered therein adjacent to the previous data fields of column 401A and column 401B. Thus, a new query 120 has been built having results displayed in columns 401A-401C. Additional forms of query suggestions 125 are also possible. For example, query suggestions 125C and 125D may include filtering and/or sorting actions upon the queried and displayed data fields. In this particular example, query suggestion 125C represents filtering of the displayed data based on a particular name (e.g., J. Doe) of column 401B. For example, query suggestion 125C may represent filtering by "Name=J. Doe," or another similar suggestion. Other filtering suggestions may include both a hidden filtering option and a filter argument in combination. For example, although a column "Status" is not illustrated as being rendered in the user interface 102B, query suggestion 125C could possibly represent filtering by "Status=Active" or other similar filtering options and arguments depending upon non-query data 124, selected query suggestions 125, and/or prior query information 142.

As further illustrated, query suggestion 125D represents sorting of the displayed data based on information in "Job Info". Other sorting arguments are also applicable depending upon non-query data 124, selected query suggestions 125, and/or prior query information 142. Accordingly, if the query suggestion 125D is selected, the data displayed at user interface 102B is sorted based on "Job Info" through sort operation 422, as illustrated in FIG. 4D.

Figure 4D:
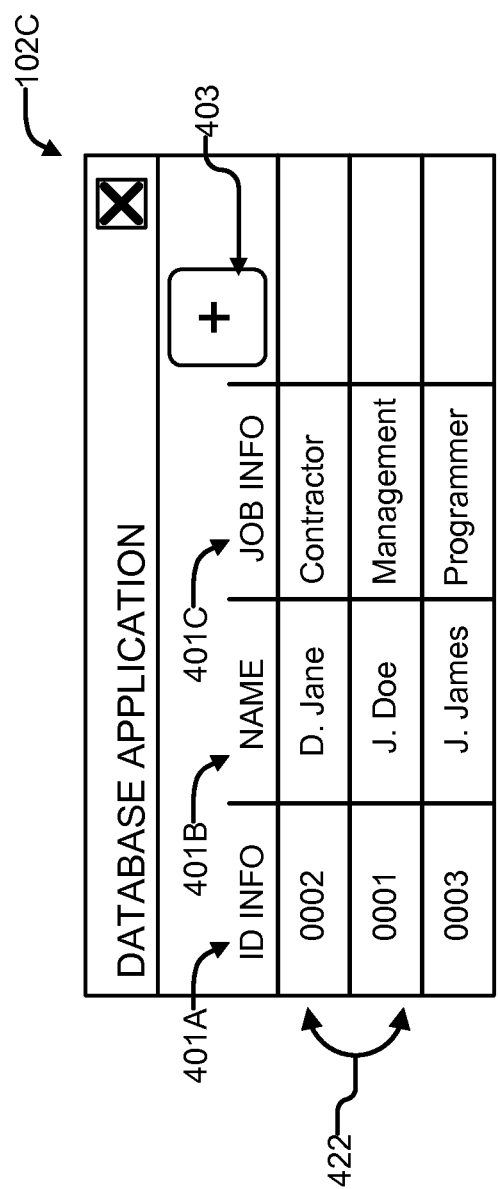

The user interface 102C illustrated in FIG. 4D shows the data sort operation 422 and the sorting results. Additionally, more query suggestion UI elements 403 may be rendered to indicate new query suggestions, for request of new query suggestions, for request of additional query suggestions, or other suitable actions or indications.

It should be appreciated that the logical operations described above and elsewhere herein may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the FIGS. and described herein. These operations may also be performed in a different order than those described herein.

Figure 5:
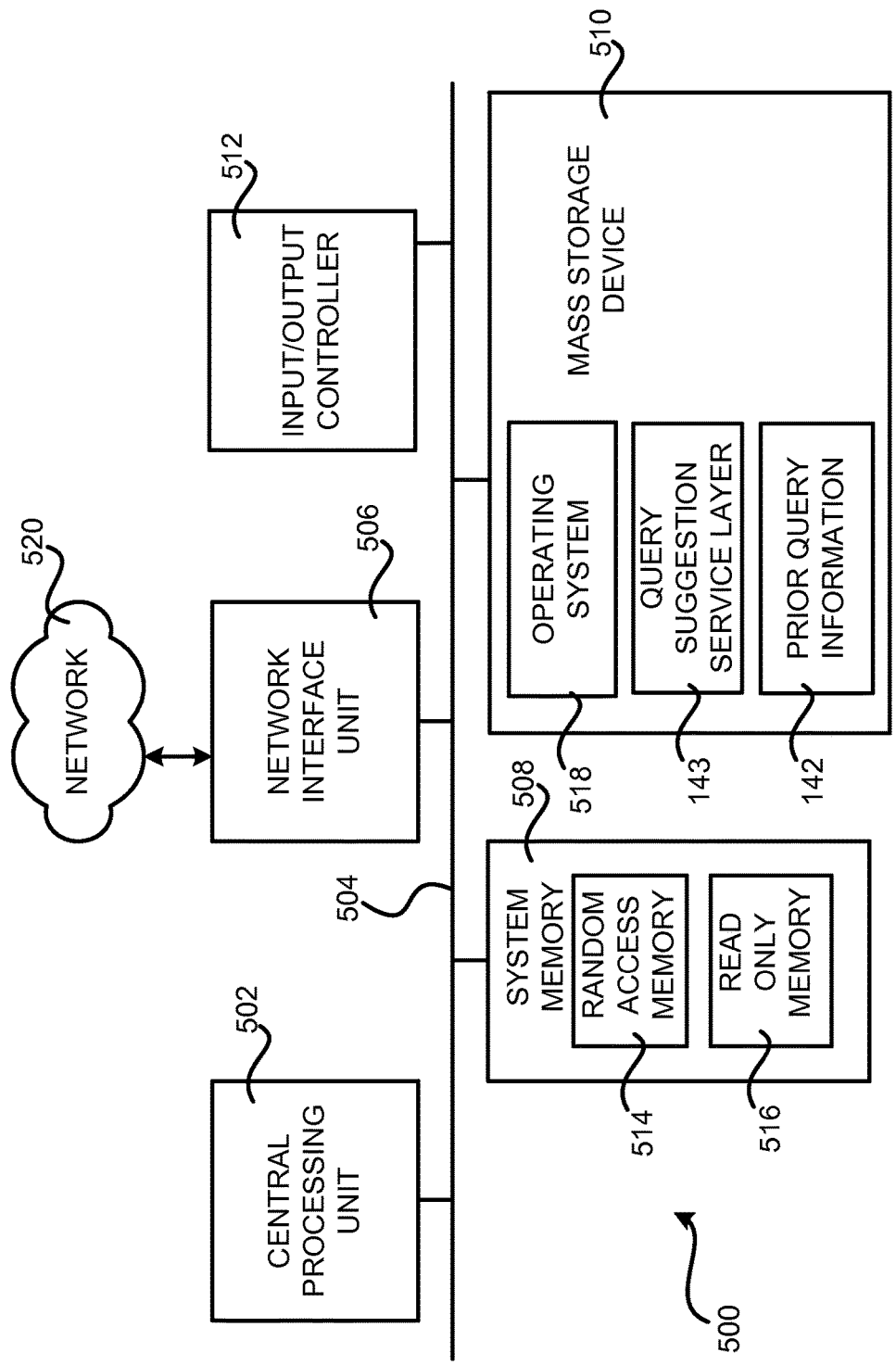
FIG. 5 is a computer architecture diagram showing an illustrative computer hardware and software architecture.

FIG. 5 illustrates an illustrative computer architecture 500 for a device capable of executing the software components described herein for providing query suggestions. Thus, the computer architecture 500 illustrated in FIG. 5 illustrates an architecture for a server computer, mobile phone, a PDA, a smart phone, a desktop computer, a netbook computer, a tablet computer, and/or a laptop computer. The computer architecture 500 may be utilized to execute any aspects of the software components presented herein.

The computer architecture 500 illustrated in FIG. 5 includes a central processing unit 502 ("CPU"), a system memory 508, including a random access memory 514

("RAM") and a read-only memory ("ROM") 516, and a system bus 504 that couples the memory 508 to the CPU 502. A basic input/output system containing the basic routines that help to transfer information between elements within the computer architecture 500, such as during startup, is stored in the ROM 516. The computer architecture 500 further includes a mass storage device 510 for storing the operating system 518 and one or more application programs including, but not limited to, query suggestion service layer 143 and prior query information 142.

The mass storage device 510 is connected to the CPU 502 through a mass storage controller (not shown) connected to the bus 504. The mass storage device 510 and its associated computer-readable media provide non-volatile storage for the computer architecture 500. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer architecture 500. For purposes of the claims, the phrase "computer storage medium," and variations thereof, does not include waves or signals per se and/or communication media.

According to various embodiments, the computer architecture 500 may operate in a networked environment using logical connections to remote computers through a network such as the network 520. The computer architecture 500 may connect to the network 520 through a network interface unit 506 connected to the bus 504. It should be appreciated that the network interface unit 506 also may be utilized to connect to other types of networks and remote computer systems, for example, data processing system 140 and/or clients 101. The computer architecture 500 also may include an input/output controller 512 for receiving and processing input from a number of other devices, including a keyboard, mouse, or electronic stylus (not shown in FIG. 5). Similarly, the input/output controller 512 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Figure 6:
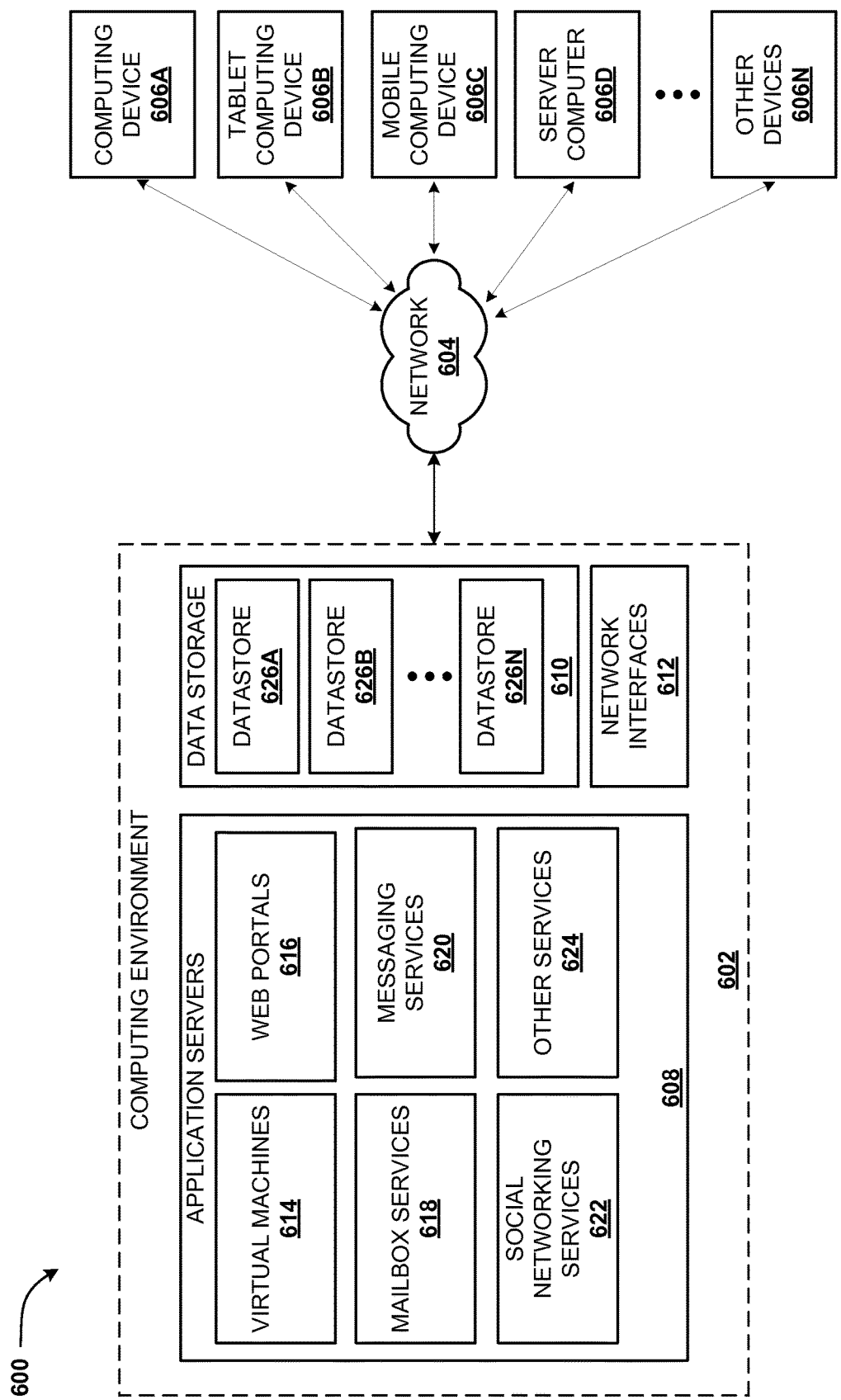
FIG. 6 is a diagram illustrating a distributed computing environment capable of implementing aspects of the technologies presented herein.

FIG. 6 illustrates an illustrative distributed computing environment 600 capable of executing the software components described herein for providing query suggestions. Thus, the distributed computing environment 600 illustrated in FIG. 6 can be used to provide the functionality described herein with respect to the system 100. The distributed computing environment 600 thus may be utilized to execute any aspects of the software components presented herein.

According to various implementations, the distributed computing environment 600 includes a computing environment 602 operating on, in communication with, or as part of the network 604. The network 604 also can include various access networks. One or more client devices 606A-606N (hereinafter referred to collectively and/or generically as "clients 606") can communicate with the computing environment 602 via the network 604 and/or other connections (not illustrated in FIG. 6). In the illustrated embodiment, the clients 606 include a computing device 606A such as a laptop computer, a desktop computer, or other computing device; a slate or tablet computing device ("tablet computing device") 606B; a mobile computing device 606C such as a mobile telephone, a smart phone, or other mobile computing device; a server computer 606D; and/or other devices 606N. It should be understood that any number of clients 606 can communicate with the computing environment 602. Two example computing architectures for the clients 606 are illustrated and described herein with reference to FIGS. 5 and 7. It should be understood that the illustrated clients 606 and computing architectures illustrated and described herein are illustrative, and should not be construed as being limited in any way.

In the illustrated embodiment, the computing environment 602 includes application servers 608, data storage 610, and one or more network interfaces 612. According to various implementations, the functionality of the application servers 608 can be provided by one or more server computers that are executing as part of, or in communication with, the network 604. The application servers 608 can host various services, virtual machines, portals, and/or other resources. In the illustrated embodiment, the application servers 608 host one or more virtual machines 614 for hosting applications or other functionality. According to various implementations, the virtual machines 614 host one or more applications and/or software modules for providing the functionality described herein for providing query suggestions. It should be understood that this embodiment is illustrative, and should not be construed as being limiting in any way. The application servers 608 also host or provide access to one or more Web portals, link pages, Web sites, and/or other information ("Web portals") 616.

According to various implementations, the application servers 608 also include one or more mailbox services 618 and one or more messaging services 620. The mailbox services 618 can include electronic mail ("email") services. The mailbox services 618 also can include various personal information management ("PIM") services including, but not limited to, calendar services, contact management services, collaboration services, and/or other services. The messaging services 620 can include, but are not limited to, instant messaging services, chat services, forum services, and/or other communication services.

The application servers 608 also can include one or more social networking services 622. The social networking services 622 can include various social networking services including, but not limited to, services for sharing or posting status updates, instant messages, links, photos, videos, and/or other information; services for commenting or displaying interest in articles, products, blogs, or other resources; and/or other services. In some embodiments, the social networking services 622 are provided by or include the FACEBOOK social networking service, the LINKEDIN professional networking service, the MYSPACE social networking service, the FOURSQUARE geographic networking service, the YAMMER office colleague networking service, and the like. In other embodiments, the social networking services 622 are provided by other services, sites, and/or providers that may or may not explicitly be known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from MICROSOFT CORPORATION in Redmond, Wash. Other services are possible and are contemplated.

The social networking services 622 also can include commenting, blogging, and/or microblogging services. Examples of such services include, but are not limited to, the YELP commenting service, the KUDZU review service, the OFFICETALK enterprise microblogging service, the TWITTER messaging service, the GOOGLE BUZZ service, and/or other services. It should be appreciated that the above lists of services are not exhaustive and that numerous additional and/or alternative social networking services 622 are not mentioned herein for the sake of brevity. As such, the above embodiments are illustrative, and should not be construed as being limited in any way.

As shown in FIG. 6, the application servers 608 also can host other services, applications, portals, and/or other resources ("other resources") 624. The other resources 624 can include, but are not limited to, the data sources 141, prior query information 142, and/or query suggestion service layer 143. It thus can be appreciated that the computing environment 602 can provide integration of the concepts and technologies disclosed herein provided herein for providing query suggestions with various mailbox, messaging, social networking, and/or other services or resources. For example, the concepts and technologies disclosed herein can utilize social networking or other information as a portion of non-query data 124 such that at least initial query suggestions 125 may be based on personal information used to match against prior query information 142. Furthermore, although described through the phrase "query," it should be appreciated that other forms of search are applicable such that the query suggestions 125 may be embodied as search terms for a search engine, data fields for school projects, and other forms of query suggestion.

As mentioned above, the computing environment 602 can include the data storage 610. According to various implementations, the functionality of the data storage 610 is provided by one or more databases operating on, or in communication with, the network 604. The functionality of the data storage 610 also can be provided by one or more server computers configured to host data for the computing environment 602. The data storage 610 can include, host, or provide one or more real or virtual datastores 626A-626N (hereinafter referred to collectively and/or generically as "datastores 626"). The datastores 626 are configured to host data used or created by the application servers 608 and/or other data.

The computing environment 602 can communicate with, or be accessed by, the network interfaces 612. The network interfaces 612 can include various types of network hardware and software for supporting communications between two or more computing devices including, but not limited to, the clients 606 and the application servers 608. It should be appreciated that the network interfaces 612 also may be utilized to connect to other types of networks and/or computer systems.

It should be understood that the distributed computing environment 600 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 600 provides the software functionality described herein as a service to the clients 606. It should be understood that the clients 606 can include real or virtual machines including, but not limited to, server computers, web servers, personal computers, mobile computing devices, smart phones, and/or other devices. As such, various embodiments of the concepts and technologies disclosed herein enable any device configured to access the distributed computing environment 600 to utilize the functionality described herein for providing query suggestions.

Turning now to FIG. 7, an illustrative computing device architecture 700 for a computing device that is capable of executing various software components described herein for providing query suggestions. The computing device architecture 700 is applicable to computing devices that facilitate mobile computing due, in part, to form factor, wireless connectivity, and/or battery-powered operation. In some embodiments, the computing devices include, but are not limited to, mobile telephones, tablet devices, slate devices, portable video game devices, and the like. Moreover, the computing device architecture 700 is applicable to any of the clients 606 shown in FIG. 6. Furthermore, aspects of the computing device architecture 700 may be applicable to traditional desktop computers, portable computers (e.g., laptops, notebooks, ultra-portables, and netbooks), server computers, and other computer systems, such as described herein with reference to FIG. 5. For example, the single touch and multi-touch aspects disclosed herein below may be applied to desktop computers that utilize a touchscreen or some other touch-enabled device, such as a touch-enabled track pad or touch-enabled mouse.

The computing device architecture 700 illustrated in FIG. 7 includes a processor 702, memory components 704, network connectivity components 706, sensor components 708, input/output components 710, and power components 712. In the illustrated embodiment, the processor 702 is in communication with the memory components 704, the network connectivity components 706, the sensor components 708, the input/output ("I/O") components 710, and the power components 712. Although no connections are shown between the individuals components illustrated in FIG. 7, the components can interact to carry out device functions. In some embodiments, the components are arranged so as to communicate via one or more busses (not shown).

The processor 702 includes a central processing unit ("CPU") configured to process data, execute computer-executable instructions of one or more application programs, and communicate with other components of the computing device architecture 700 in order to perform various functionality described herein. The processor 702 may be utilized to execute aspects of the software components presented herein and, particularly, those that utilize, at least in part, a touch-enabled input.

In some embodiments, the processor 702 includes a graphics processing unit ("GPU") configured to accelerate operations performed by the CPU, including, but not limited to, operations performed by executing general-purpose scientific and engineering computing applications, as well as graphics-intensive computing applications such as high resolution video (e.g., 720P, 1080P, and greater), video games, three-dimensional ("D") modeling applications, and the like. In some embodiments, the processor 702 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some embodiments, the processor 702 is, or is included in, a system-on-chip ("SoC") along with one or more of the other components described herein below. For example, the SoC may include the processor 702, a GPU, one or more of the network connectivity components 706, and one or more of the sensor components 708. In some embodiments, the processor 702 is fabricated, in part, utilizing a package-on-package ("PoP") integrated circuit packaging technique. Moreover, the processor 702 may be a single core or multi-core processor.

The processor 702 may be created in accordance with an ARM architecture, available for license from ARM HOLDINGS of Cambridge, United Kingdom. Alternatively, the processor 702 may be created in accordance with an x86 architecture, such as is available from INTEL CORPORATION of Mountain View, Calif. and others. In some embodiments, the processor 702 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 704 include a random access memory ("RAM") 714, a read-only memory ("ROM") 716, an integrated storage memory ("integrated storage") 718, and a removable storage memory ("removable storage") 720. In some embodiments, the RAM 714 or a portion thereof, the ROM 716 or a portion thereof, and/or some combination the RAM 714 and the ROM 716 is integrated in the processor 702. In some embodiments, the ROM 716 is configured to store a firmware, an operating system or a portion thereof (e.g., operating system kernel), and/or a bootloader to load an operating system kernel from the integrated storage 718 or the removable storage 720.

The integrated storage 718 can include a solid-state memory, a hard disk, or a combination of solid-state memory and a hard disk. The integrated storage 718 may be soldered or otherwise connected to a logic board upon which the processor 702 and other components described herein also may be connected. As such, the integrated storage 718 is integrated in the computing device. The integrated storage 718 is configured to store an operating system or portions thereof, application programs, data, and other software components described herein.

The removable storage 720 can include a solid-state memory, a hard disk, or a combination of solid-state memory and a hard disk. In some embodiments, the removable storage 720 is provided in lieu of the integrated storage 718. In other embodiments, the removable storage 720 is provided as additional optional storage. In some embodiments, the removable storage 720 is logically combined with the integrated storage 718 such that the total available storage is made available and shown to a user as a total combined capacity of the integrated storage 718 and the removable storage 720.

The removable storage 720 is configured to be inserted into a removable storage memory slot (not shown) or other mechanism by which the removable storage 720 is inserted and secured to facilitate a connection over which the removable storage 720 can communicate with other components of the computing device, such as the processor 702. The removable storage 720 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 704 can store an operating system. According to various embodiments, the operating system includes, but is not limited to, SYMBIAN OS from SYMBIAN LIMITED, WINDOWS MOBILE OS from MICROSOFT CORPORATION of Redmond, Wash., WINDOWS PHONE OS from MICROSOFT CORPORATION, the WINDOWS operating system from MICROSOFT CORPORATION, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 706 include a wireless wide area network component ("WWAN component") 722, a wireless local area network component ("WLAN component") 724, and a wireless personal area network component ("WPAN component") 726. The network connectivity components 706 facilitate communications to and from a network 728, which may be a WWAN, a WLAN, or a WPAN. Although a single network 728 is illustrated, the network connectivity components 706 may facilitate simultaneous communication with multiple networks. For example, the network connectivity components 706 may facilitate simultaneous communications with multiple networks via one or more of a WWAN, a WLAN, or a WPAN.

The network 728 may be a WWAN, such as a mobile telecommunications network utilizing one or more mobile telecommunications technologies to provide voice and/or data services to a computing device utilizing the computing device architecture 700 via the WWAN component 722. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 728 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 728 may be configured to provide voice and/or data communications with any combination of the above technologies. The network 728 may be configured to or adapted to provide voice and/or data communications in accordance with future generation technologies.

In some configurations, the WWAN component 722 is configured to provide dual-multi-mode connectivity to the network 728. For example, the WWAN component 722 may be configured to provide connectivity to the network 728, wherein the network 728 provides service via GSM and UMTS technologies, or via some other combination of technologies. Alternatively, multiple WWAN components 722 may be utilized to perform such functionality, and/or provide additional functionality to support other non-compatible technologies (i.e., incapable of being supported by a single WWAN component). The WWAN component 722 may facilitate similar connectivity to multiple networks (e.g., a UMTS network and an LTE network).

The network 728 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some embodiments, the WLAN is implemented utilizing one or more wireless WI-FI access points. In some embodiments, one or more of the wireless WI-FI access points are another computing device with connectivity to a WWAN that are functioning as a WI-FI hotspot. The WLAN component 724 is configured to connect to the network 728 via the WI-FI access points. Such connections may be secured via various encryption technologies including, but not limited, WI-FI Protected Access ("WPA"), WPA2, Wired Equivalent Privacy ("WEP"), and the like.

The network 728 may be a WPAN operating in accordance with Infrared Data Association ("IrDA"), BLUETOOTH, wireless Universal Serial Bus ("USB"), Z-Wave, ZIGBEE, or some other short-range wireless technology. In some embodiments, the WPAN component 726 is configured to facilitate communications with other devices, such as peripherals, computers, or other computing devices via the WPAN.

The sensor components 708 include a magnetometer 730, an ambient light sensor 732, a proximity sensor 734, an accelerometer 736, a gyroscope 738, and a Global Positioning System sensor ("GPS sensor") 740. It is contemplated that other sensors, such as, but not limited to, temperature sensors or shock detection sensors, also may be incorporated in the computing device architecture 700.

The magnetometer 730 is configured to measure the strength and direction of a magnetic field. In some embodiments the magnetometer 730 provides measurements to a compass application program stored within one of the memory components 704 in order to provide a user with accurate directions in a frame of reference including the cardinal directions, north, south, east, and west. Similar measurements may be provided to a navigation application program that includes a compass component. Other uses of measurements obtained by the magnetometer 730 are contemplated.

The ambient light sensor 732 is configured to measure ambient light. In some embodiments, the ambient light sensor 732 provides measurements to an application program stored within one the memory components 704 in order to automatically adjust the brightness of a display (described below) to compensate for low-light and high-light environments. Other uses of measurements obtained by the ambient light sensor 732 are contemplated.

The proximity sensor 734 is configured to detect the presence of an object or thing in proximity to the computing device without direct contact. In some embodiments, the proximity sensor 734 detects the presence of a user's body (e.g., the user's face) and provides this information to an application program stored within one of the memory components 704 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 734 are contemplated.

The accelerometer 736 is configured to measure proper acceleration. In some embodiments, output from the accelerometer 736 is used by an application program as an input mechanism to control some functionality of the application program. For example, the application program may be a video game in which a character, a portion thereof, or an object is moved or otherwise manipulated in response to input received via the accelerometer 736. In some embodiments, output from the accelerometer 736 is provided to an application program for use in switching between landscape and portrait modes, calculating coordinate acceleration, or detecting a fall. Other uses of the accelerometer 736 are contemplated.

The gyroscope 738 is configured to measure and maintain orientation. In some embodiments, output from the gyroscope 738 is used by an application program as an input mechanism to control some functionality of the application program. For example, the gyroscope 738 can be used for accurate recognition of movement within a 3D environment of a video game application or some other application. In some embodiments, an application program utilizes output from the gyroscope 738 and the accelerometer 736 to enhance control of some functionality of the application program. Other uses of the gyroscope 738 are contemplated.

The GPS sensor 740 is configured to receive signals from GPS satellites for use in calculating a location. The location calculated by the GPS sensor 740 may be used by any application program that requires or benefits from location information. For example, the location calculated by the GPS sensor 740 may be used with a navigation application program to provide directions from the location to a destination or directions from the destination to the location. Moreover, the GPS sensor 740 may be used to provide location information to an external location-based service, such as E911 service. The GPS sensor 740 may obtain location information generated via WI-FI, WIMAX, and/or cellular triangulation techniques utilizing one or more of the network connectivity components 706 to aid the GPS sensor 740 in obtaining a location fix. The GPS sensor 740 may also be used in Assisted GPS ("A-GPS") systems.

The I/O components 710 include a display 742, a touchscreen 744, a data I/O interface component ("data I/O") 746, an audio I/O interface component ("audio I/O") 748, a video I/O interface component ("video I/O") 750, and a camera 752. In some embodiments, the display 742 and the touchscreen 744 are combined. In some embodiments two or more of the data I/O component 746, the audio I/O component 748, and the video I/O component 750 are combined. The I/O components 710 may include discrete processors configured to support the various interface described below, or may include processing functionality built-in to the processor 702.

The display 742 is an output device configured to present information in a visual form. In particular, the display 742 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some embodiments, the display 742 is a liquid crystal display ("LCD") utilizing any active or passive matrix technology and any backlighting technology (if used). In some embodiments, the display 742 is an organic light emitting diode ("OLED") display. Other display types are contemplated.

The touchscreen 744 is an input device configured to detect the presence and location of a touch. The touchscreen 744 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen 744 is incorporated on top of the display 742 as a transparent layer to enable a user to use one or more touches to interact with objects or other information presented on the display 742. In other embodiments, the touchscreen 744 is a touch pad incorporated on a surface of the computing device that does not include the display 742. For example, the computing device may have a touchscreen incorporated on top of the display 742 and a touch pad on a surface opposite the display 742.

In some configurations, the touchscreen 744 is a single-touch touchscreen. In other configurations, the touchscreen 744 is a multi-touch touchscreen. In some configurations, the touchscreen 744 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 744. As such, a developer may create gestures that are specific to a particular application program.

In some configurations, the touchscreen 744 supports a tap gesture in which a user taps the touchscreen 744 once on an item presented on the display 742. The tap gesture may be used for various reasons including, but not limited to, opening or launching whatever the user taps. In some embodiments, the touchscreen 744 supports a double tap gesture in which a user taps the touchscreen 744 twice on an item presented on the display 742. The double tap gesture may be used for various reasons including, but not limited to, zooming in or zooming out in stages. In some embodiments, the touchscreen 744 supports a tap and hold gesture in which a user taps the touchscreen 744 and maintains contact for at least a pre-defined time. The tap and hold gesture may be used for various reasons including, but not limited to, opening a context-specific menu.

In some embodiments, the touchscreen 744 supports a pan gesture in which a user places a finger on the touchscreen 744 and maintains contact with the touchscreen 744 while moving the finger on the touchscreen 744. The pan gesture may be used for various reasons including, but not limited to, moving through screens, images, or menus at a controlled rate. Multiple finger pan gestures are also contemplated. In some embodiments, the touchscreen 744 supports a flick gesture in which a user swipes a finger in the direction the user wants the screen to move. The flick gesture may be used for various reasons including, but not limited to, scrolling horizontally or vertically through menus or pages. In some embodiments, the touchscreen 744 supports a pinch and stretch gesture in which a user makes a pinching motion with two fingers (e.g., thumb and forefinger) on the touchscreen 744 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 744. As such, the above gestures should be understood as being illustrative and should not be construed as being limiting in any way.

The data I/O interface component 746 is configured to facilitate input of data to the computing device and output of data from the computing device. In some embodiments, the data I/O interface component 746 includes a connector configured to provide wired connectivity between the computing device and a computer system, for example, for synchronization operation purposes. The connector may be a proprietary connector or a standardized connector such as USB, micro-USB, mini-USB, or the like. In some embodiments, the connector is a dock connector for docking the computing device with another device such as a docking station, audio device (e.g., a digital music player), or video device.

The audio I/O interface component 748 is configured to provide audio input and/or output capabilities to the computing device. In some embodiments, the audio I/O interface component 746 includes a microphone configured to collect audio signals. In some embodiments, the audio I/O interface component 746 includes a headphone jack configured to provide connectivity for headphones or other external speakers. In some embodiments, the audio interface component 748 includes a speaker for the output of audio signals. In some embodiments, the audio I/O interface component 746 includes an optical audio cable out.

The video I/O interface component 750 is configured to provide video input and/or output capabilities to the computing device. In some embodiments, the video I/O interface component 750 includes a video connector configured to receive video as input from another device (e.g., a video media player such as a DVD or BLURAY player) or send video as output to another device (e.g., a monitor, a television, or some other external display). In some embodiments, the video I/O interface component 750 includes a High-Definition Multimedia Interface ("HDMI"), mini-HDMI, micro-HDMI, DisplayPort, or proprietary connector to input/output video content. In some embodiments, the video I/O interface component 750 or portions thereof is combined with the audio I/O interface component 748 or portions thereof.

The camera 752 can be configured to capture still images and/or video. The camera 752 may utilize a charge coupled device ("CCD") or a complementary metal oxide semiconductor ("CMOS") image sensor to capture images. In some embodiments, the camera 752 includes a flash to aid in taking pictures in low-light environments. Settings for the camera 752 may be implemented as hardware or software buttons.

Although not illustrated, one or more hardware buttons may also be included in the computing device architecture 700. The hardware buttons may be used for controlling some operational aspect of the computing device. The hardware buttons may be dedicated buttons or multi-use buttons. The hardware buttons may be mechanical or sensor-based.

The illustrated power components 712 include one or more batteries 754, which can be connected to a battery gauge 756. The batteries 754 may be rechargeable or disposable. Rechargeable battery types include, but are not limited to, lithium polymer, lithium ion, nickel cadmium, and nickel metal hydride. Each of the batteries 754 may be made of one or more cells.

The battery gauge 756 can be configured to measure battery parameters such as current, voltage, and temperature. In some embodiments, the battery gauge 756 is configured to measure the effect of a battery's discharge rate, temperature, age and other factors to predict remaining life within a certain percentage of error. In some embodiments, the battery gauge 756 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 712 may also include a power connector, which may be combined with one or more of the aforementioned I/O components 710. The power components 712 may interface with an external power system or charging equipment via a power I/O component 744.

Based on the foregoing, it should be appreciated that technologies for providing query suggestions, and for building queries based on query suggestions, have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The technologies disclosed herein may be described as set forth in the following clauses:

Clause 1. A computer-implemented method for providing query suggestions, the method comprising:
detecting access at a data source;
collecting non-query data based on the detected access;
determining an initial query suggestion for a query for the data source based on the non-query data; and
returning the initial query suggestion.

Clause 2. The computer-implemented method according to clause 1, wherein the non-query data comprises metadata describing identity data, profile data, or contextual information.

Clause 3. The computer-implemented method according to any of clauses 1-2, wherein determining the initial query suggestion comprises: comparing the metadata to prior query or metadata information;
determining that at least a portion of the metadata is associated with a portion of the prior query information; and
generating the initial query suggestion based on the portion of the prior query information.

Clause 4. The computer-implemented method according to any of clauses 1-3, wherein the prior query information comprises at least one of default query statements, basic query statements, or previously submitted queries.

Clause 5. The computer-implemented method according to any of clauses 1-4, wherein determining the initial query suggestion comprises:

comparing the non-query data to a set of default query statements;

determining that at least a portion of the non-query data is associated with at least one default query statement of the set of default query statements; and generating the initial query suggestion based on the at least one default query statement.

Clause 6. The computer-implemented method according to any of clauses 1-5, wherein detecting access at a data source comprises:

receiving a request to access data at the data source;
receiving a request to receive the initial query suggestion; or
determining that a file has been opened Clause 7. The computer-implemented method according to any of clauses 1-6, further comprising returning the initial query suggestions through a user interface (UI) element.

Clause 8. The computer-implemented method according to any of clauses 1-7, wherein the UI element is a selectable graphic rendering representative of the content of the initial query suggestion, or wherein the UI element comprises a portion of automatically filled text representing at least a portion of text from a query statement.

Clause 9. The computer-implemented method according to any of clauses 1-8, further comprising:

receiving indication of action on the initial query suggestion;
determining an additional query suggestion for the query for the data source based on a query or non-query data; and
returning the additional query suggestion.

Clause 10. The computer-implemented method according to any of clauses 1-9, wherein the query comprises data indicative of at least a portion of a query statement.

Clause 11. A data processing system configured to provide query suggestions, the system comprising:

at least one computer executing a query suggestion service layer configured to detect access at a data source from a client,
collect non-query data,
receive a query for the data source from the client,
determine a query suggestion for the query based on the non-query data and the query, and
return the query suggestion to the client.

Clause 12. The data processing system according to clause 11, wherein non-query data comprises metadata describing identity data, profile data, or contextual information.

Clause 13. The data processing system according to any of clauses 11-12, wherein determining the query suggestion comprises:

comparing the metadata and query to prior query or metadata information;
determining that at least a portion of the metadata or query is associated with a portion of the prior query information; and
generating the query suggestion based on the portion of the prior query information.

Clause 14. The data processing system according to any of clauses 11-13, wherein the prior query information comprises at least one of default query statements, basic query statements, or previously submitted queries.

Clause 15. The data processing system according to any of clauses 11-14, wherein detecting access at a data source comprises:

receiving a request to access data at the data source;
receiving a request to receive the initial query suggestion; or
determining that a file has been opened at the client.

Clause 16. The data processing system according to any of clauses 11-15, wherein the query suggestion service layer is further configured to:

determine that the query includes a change in response to providing the query suggestion;
apply the change to the query;
determine an additional query suggestion for the query for the data source based on the applied change; and
return the additional query suggestion to the client.

Clause 17. The data processing system according to any of clauses 11-16, wherein the additional query suggestion comprises a suggestion to filter or sort query results based on prior query information.

Clause 18. A computer-implemented method for building data queries through query suggestions, the method comprising:

detecting access at a data source;
determining query suggestions for a search query at the data source based on non-query data and query data, wherein the query suggestions are selectable query suggestions for appending to the search query, and wherein the query data is based upon selection of the query suggestions; and
causing the query suggestions to be displayed through a graphical user-interface (UI) configured to receive selections of individual query suggestions of the query suggestions.

Clause 19. The computer-implemented according to clause 18, wherein the non-query data comprises metadata describing identity data, profile data, or contextual information for a client computer accessing the data source.

Clause 20. The compute-implemented method according to any of clauses 18 and 19, wherein determining the query suggestions comprises:

comparing the query data to prior query information;
determining that at least a portion of the query data is associated with a portion of the prior query information; and
generating the query suggestions based on the portion of the prior query information.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing a query suggestion, the method comprising:

detecting access at a data source;
collecting non-query data based on the detected access, the non-query data comprising metadata describing identity data, profile data, or contextual information;
determining an initial query suggestion for a query of the data source based on the non-query data, the determining comprising:
comparing the non-query data to prior query information;
determining that at least a portion of the non-query data is associated with a portion of the prior query information; and generating the initial query suggestion based, at least in part, on the portion of the prior query information;
returning the initial query suggestion;
receiving an indication of action on the initial query suggestion;
determining an additional query suggestion for the query for the data source, the query comprises data indicative of at least a portion of a query statement; and
returning the additional query suggestion.

2. The computer-implemented method of claim 1, wherein the prior query information comprises at least one of default query statements, basic query statements, or previously submitted queries.

3. The computer-implemented method of claim 1, wherein the determining the initial query suggestion further comprises:
comparing the non-query data to a set of default query statements;
determining that at least a portion of the non-query data is associated with at least one default query statement of the set of default query statements; and
generating the initial query suggestion based, at least in part, on the at least one default query statement.

4. The computer-implemented method of claim 1, wherein the detecting access at the data source comprises:
receiving a request to access data at the data source;
receiving a request to receive the initial query suggestion; or
determining that a file has been opened.

5. The computer-implemented method of claim 1, wherein the returning the initial query suggestion comprises returning the initial query suggestion through a user interface (UI) element.

6. The computer-implemented method of claim 5, wherein the UI element comprises a selectable graphic rendering representative of content of the initial query suggestion, or wherein the UI element comprises a portion of automatically filled text representing at least a portion of text from a query statement.

7. A system configured to provide query suggestions, the system comprising:
one or more hardware processors; and
a computer-readable storage medium storing instructions that, when executed by the one or more hardware processors, cause the one or more hardware processors to perform operations comprising:
detecting access at a data source;
collecting non-query data based on the detected access, the non-query data comprising metadata describing identity data, profile data, or contextual information;
determining an initial query suggestion for a query of the data source based on the non-query data, the determining comprising:
comparing the non-query data to prior query information;
determining that at least a portion of the non-query data is associated with a portion of the prior query information; and
generating an initial query suggestion based, at least in part, in the portion of the prior query information;
returning the initial query suggestion to the client;
receiving an indication of action on the initial query suggestion;
determining an additional query suggestion for the query for the data source, the query comprises data indicative of at least a portion of a query statement; and
returning the additional query suggestion.

8. The system of claim 7, wherein the detecting access at the data source comprises:
receiving a request to access data at the data source;
receiving a request to receive the query suggestion; or
determining that a file has been opened at the client.

9. The system of claim 7, wherein the receiving the indication of the action comprises:
determining that the indication of the action includes a change in response to providing the query suggestion; and
applying the change to the query, wherein
the additional query suggestion for the query for the data source is based on the applied change.

10. The system of claim 9, wherein the additional query suggestion comprises a suggestion to filter or sort query results based on prior query information.

11. A computer-implemented method for building a data query based on one or more query suggestions, the method comprising:
detecting access at a data source;
comparing non-query data associated with a search query at the data source to a set of default query statements, the non-query data comprising metadata describing identity data, profile data, or contextual information for a client computer accessing the data source;
determining that at least a portion of the non-query data is associated with at least one default query statement of the set of default query statements;
generating at least one query suggestion for the search query at the data, the at least one query suggestion comprising a selectable query suggestion for appending to the search query;
providing the at least one query suggestion to a client device configured to graphically display the query suggestion through a user-interface (UI) configured to receive selections of individual query suggestions of the at least one query suggestion;
receiving an indication of an action on the at least one query suggestion;
determining an additional query suggestion for the query for the data source based on a query or non-query data; and
returning the additional query suggestion.

12. The method of claim 11, wherein the detecting access at the data source comprises:
receiving a request to access data at the data source;
receiving a request to receive the query suggestion; or
determining that a file has been opened.

13. The method of claim 11, wherein the providing the at least one query suggestion comprises returning the at least one query suggestion through a user interface (UI) element.

14. The method of claim 13, wherein the UI element comprises a selectable graphic rendering representative of content of the at least one query suggestion, or wherein the UI element comprises a portion of automatically filled text representing at least a portion of text from a query statement.

* * * * *